United States Patent

[11] 3,581,896

| [72] | Inventor | Walter F. Kuhlman |
| | | Norwalk, Ohio |
| [21] | Appl. No. | 843,941 |
| [22] | Filed | July 23, 1969 |
| [45] | Patented | June 1, 1971 |
| [73] | Assignee | The Roto Corporation |
| | | Norwalk, Ohio |

[54] AUTOMATIC COOKING OIL FILTER AND LEVEL CONTROL APPARATUS
9 Claims, 8 Drawing Figs.

[52] U.S. Cl. .................................................. 210/134,
210/167, 210/251, 210/256, 210/387
[51] Int. Cl. ...................................................... B01d 33/00
[50] Field of Search ........................................... 210/DIG
387, 167, 126, 251, 386, 134, 256, 257, 258, 261,
262; 99/355, 408

[56] References Cited
UNITED STATES PATENTS

| 2,851,163 | 9/1958 | Anderson | 210/387 |
| 3,310,172 | 3/1967 | Beduhn | 210/387X |
| 3,347,378 | 10/1967 | Arnold et al. | 210/106 |
| 3,483,981 | 12/1969 | Gordon | 210/167 |

*Primary Examiner*—Frank A. Spear, Jr.
*Attorney*—Owen & Owen

ABSTRACT: Apparatus for continuously removing contaminated cooking oil from a cooker, filtering the removed oil and returning the filtered oil to the cooker. A portion of a long roll of disposable filter paper filters the oil. The filter paper is advanced whenever the filtering portion becomes dirty. The apparatus includes an oil storage reservoir and means connecting to the reservoir for maintaining a constant oil level in the cooker.

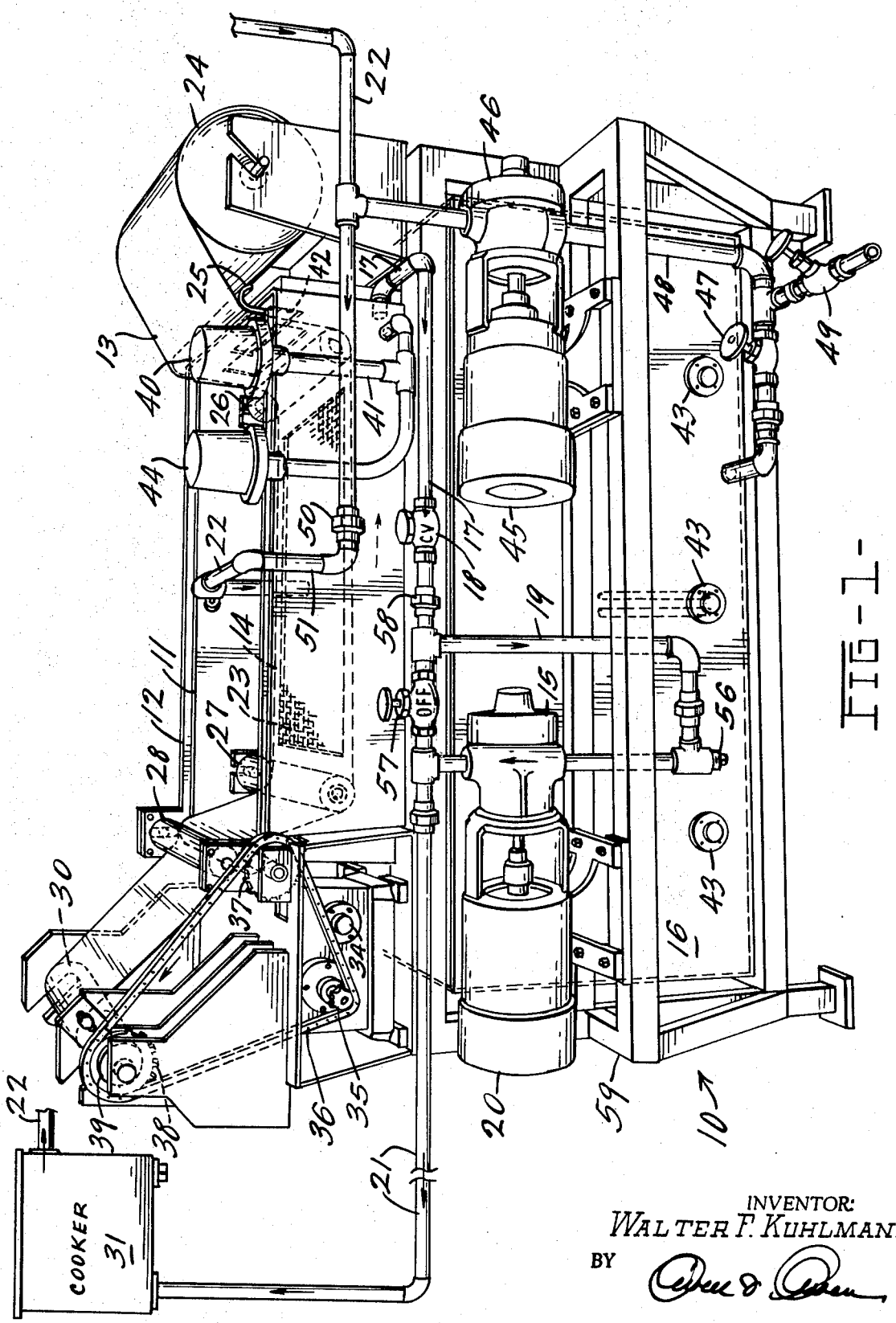

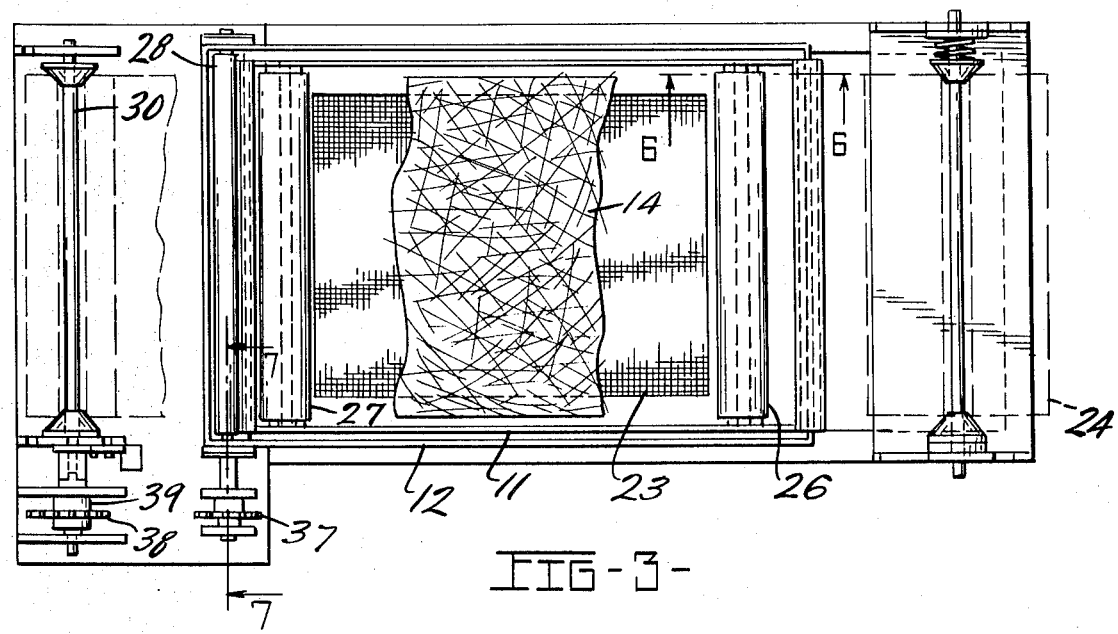
FIG-3-
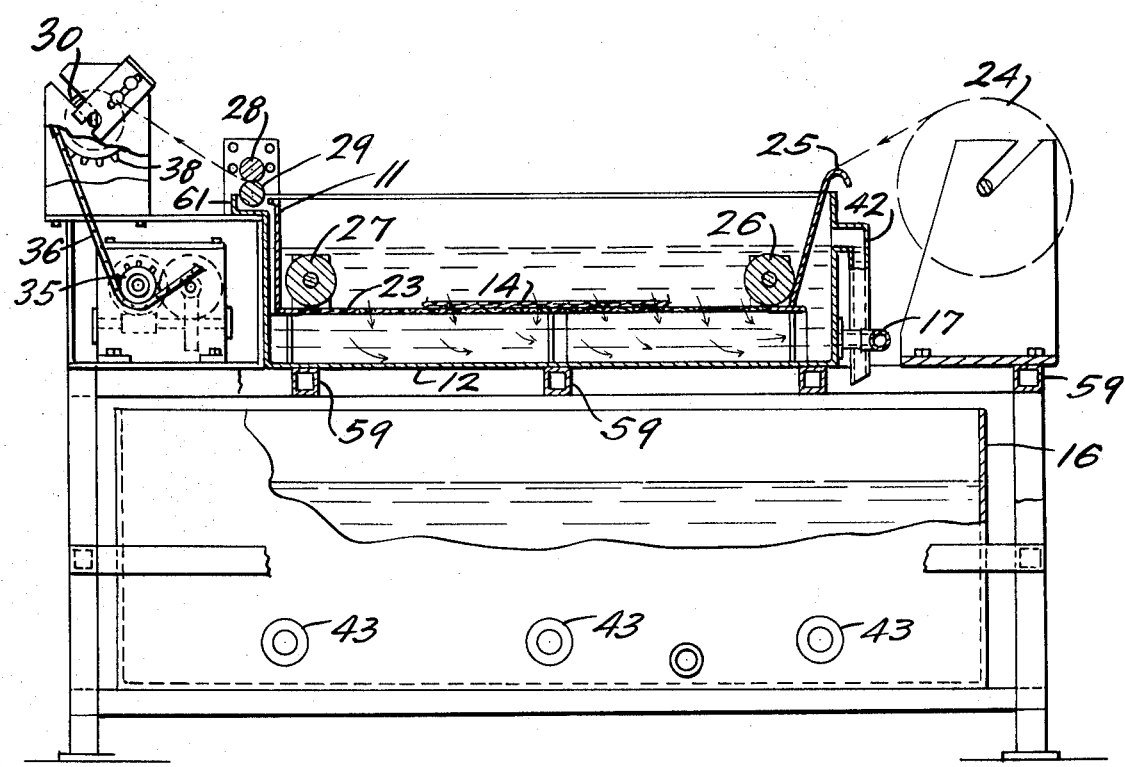
FIG-2-
INVENTOR:
WALTER F. KUHLMAN.
BY
ATT'YS.

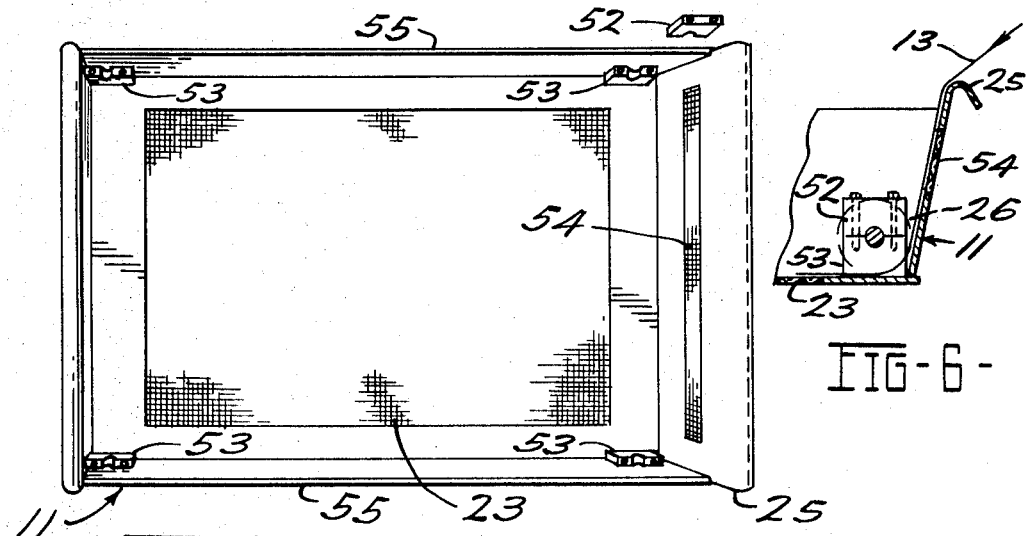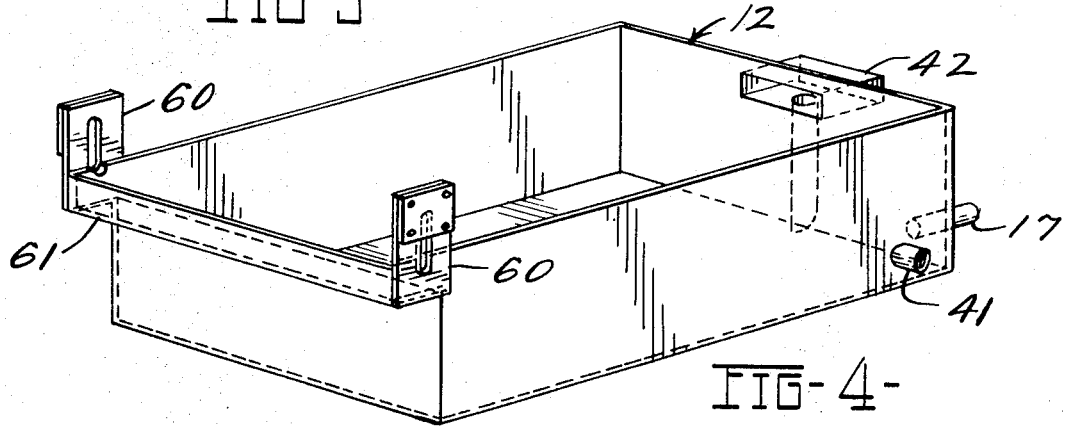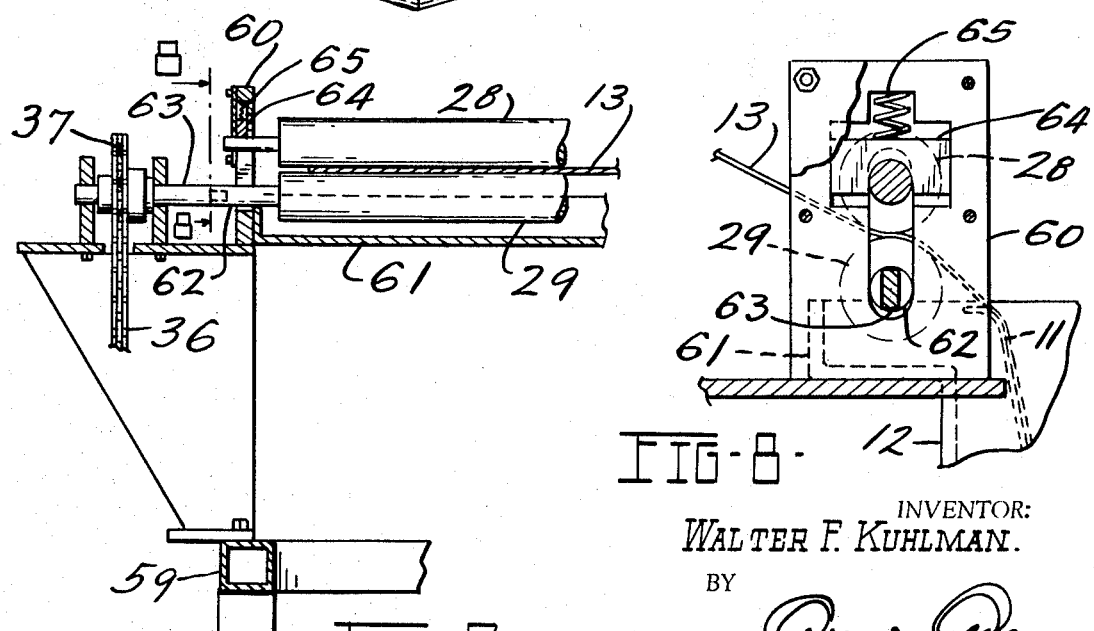

AUTOMATIC COOKING OIL FILTER AND LEVEL CONTROL APPARATUS

BACKGROUND OF THE INVENTION

This invention relates to filtering apparatus and, more particularly, to apparatus for automatically and continuously filtering hot cooking oil from a continuous deep fat cooker.

Various types of batch and continuous deep fat fryers are currently used for frying commercial quantities of food in a hot cooking oil. A major expense in using such commercial cookers occurs from the periodic replacement of the cooking oil. When food crumbs and other sediment is allowed to remain in the hot cooking oil, it will eventually burn and render the cooking oil useless. In the past, to increase the useful life of the cooking oil it has often been necessary to periodically stop the cooking operation, drain the oil from the cooker, filter the oil and return the filtered oil to the cooker. This process usually results in considerable cooker downtime and labor expense. The instant invention is directed to a novel filter for continuously and automatically filtering oil without stopping the cooking operation and without lowering the oil level within the cooker.

SUMMARY OF THE INVENTION

Apparatus is described for continuously filtering hot cooking oil while automatically maintaining a predetermined oil level in an associated cooker. Contaminated oil is delivered from an overflow in the cooker to an inner tank in the filtering apparatus. The oil flows through a filtering portion of an elongated disposable filter, through a porous bottom portion of the inner tank and into an outer tank. The filtered oil is then pumped from the outer tank back to the cooker causing more contaminated oil to flow through the overflow and into the inner tank. The filter media extends from a supply roll along the porous bottom portion of the inner tank to a takeup roll. The filter media is slowly advanced whenever the oil level in the outer tank drops below a predetermined first level. The maximum oil level in the outer tank is limited by an oil overflow leading to an oil storage reservoir. The minimum oil level in the outer tank is regulated by a pump connected to pump oil from the reservoir to the inner tank whenever the level in the outer tank drops below a predetermined second level. By continuously pumping clean oil into the cooker; removing contaminated oil from the cooker by an overflow; and regulating the oil level in the filter, the oil level in the cooker in constantly maintained at the overflow level, even as relatively large quantities of food are added to and removed from the cooker.

Accordingly, it is a primary object of the invention to provide an improved oil filter for continuously and automatically filtering hot cooking oil.

Another object of the invention is to provide apparatus for maintaining a constant oil level in a deep fat cooker while a portion of the oil is removed for filtering.

Other objects and advantages of the invention will become apparent from the following detailed description, with reference being made to the accompanying drawings.

BRIEF DESCRIPTION OF THE DRAWINGS

FIG. 1 is a front perspective view of an automatic oil filter and level control apparatus constructed according to the instant invention;

FIG. 2 is a partially broken away front elevational view of the improved automatic oil filter and level control apparatus constructed according to the instant invention;

FIG. 3 is a plan view of the improved automatic oil filter and level control apparatus constructed according to the instant invention;

FIG. 4 is a view in perspective of an outer tank portion of the oil filter and showing an oil overflow;

FIG. 5 is a plan view of an inner tank portion of the oil filter;

FIG. 6 is a cross-sectional view taken along line 6-6 of FIG. 3 and showing in detail an idler roll assembly;

FIG. 7 is a cross-sectional view taken along line 7-7 of FIG. 3 and showing in detail a compaction roll drive; and FIG. 8 is a cross-sectional view taken along line 8-8 of FIG. 7.

DESCRIPTION OF THE PREFERRED EMBODIMENTS

Referring now to FIGS. 1—3, an automatic cooking oil filter and level control apparatus, according to the instant invention, is generally indicated by the reference number 10. The apparatus 10 includes an inner tank 11 for receiving and holding contaminated cooking oil, an outer tank 12 for holding filtered cooking oil, an elongated filter media 13 a portion 14 of which separates the inner tank 11 and the outer tank 12. The apparatus 10 also includes an oil delivery pump 15 and an oil storage reservoir 16. In operation, clean filtered oil flows from the outer tank 12 through a pipe 17, a check valve 18 and a pipe 19 to the pump 15. A motor 20 continuously drives the pump 15 to deliver oil through a pipe 21 to a cooker 31 (see FIG. 1). Although the cooker 31 may be of the batch type, it is preferably of the continuous type wherein food is cooked as it is conveyed through the hot cooking oil. The cooker 31 is provided with an oil overflow for limiting the maximum oil level and establishing a desired oil level. The cooker 31 is preferably positioned such that contaminated oil will flow by gravity from the oil overflow through a pipe 22 into the inner tank 11 of the apparatus 10. From the inner tank 11, the contaminated oil will flow downwardly through the filtering portion 14 of the filter media 13 and through a porous bottom portion 23 of the inner tank 11 into the outer tank 12.

The filter media 13 is preferably a long disposable filter paper. The filter media 13 extends from a supply roll 24 over a rounded edge 25 of the inner tank 11, around an idler roll 26, across the porous bottom portion 23 of the inner tank 11, around a second idler roll 27, between upper and lower compaction rolls 28 and 29, and is collected on a takeup roll 30. A motor 34 is connected through a speed reducer 35 to drive a chain 36. The chain 36 drives the compaction roll 29 through a sprocket 37 and the takeup roll 30 through a sprocket 38 and a slip clutch 39. When the motor 34 is energized, the compaction roll 29 is slowly driven to pull clean filter media 13 from the supply roll 24 into the inner tank 11, around the idler roll 26 and over the porous bottom portion 23 of the inner tank 11. The dirty filtering portion 14 of the filter media 13 is simultaneously pulled with the trapped contaminate around the idler roll 27 and between the compaction rolls 28 and 29. The compaction rolls 28 and 29 operate as a wringer to squeeze oil from the filter media 13 and to compact the contaminate into the filter media 13. From the compaction rolls 28 and 29, the dirty filter media 13 is collected on the takeup roll 30. The slip clutch 39 is provided to compensate for the changing diameter of the takeup roll 30 as the dirty filter media 13 is collected thereon.

A pressure-sensitive switch 40 is connected by means of a pipe 41 to the lower portion of the outer tank 12. When contaminated cooking oil is delivered to the inner tank 11, it will normally flow through the filtering portion 14 of the filter media 13 into the outer tank 12, tending to seek its own level. When the filtering portion 14 becomes sufficiently contaminated, the oil level in the inner tank 11 will rise while the oil level in the outer tank 12 will drop. The switch 40 is sensitive to the drop in oil level in the outer tank 12 and is closed to energize the motor 34 when the oil level drops below a predetermined first level. The filter media 13 will then be advanced until the oil level in the outer tank 12 rises to a point sufficient to open the switch 40.

As shown in FIGS. 1 and 2, the apparatus 10 is also provided with the lower oil storage reservoir 16. The outer tank 12 is provided with an oil overflow 42 (see FIG. 2) which drains into the reservoir 16. The oil overflow 42 establishes a maximum oil level in the outer tank 12. When quantities of food are placed in the associated cooker, the quantity of oil displaced by the food will overflow into the inner tank 11, flow through the filter media 13 into the outer tank 12 and flow through the overflow 42 into the reservoir 16. The oil will remain in the reservoir 16 until additional oil is needed by the cooker. Conventional electric immersion heaters 43 are provided in the reservoir 16 to maintain the stored oil in a hot liquid state.

When a quantity of food is removed from the associated cooker, the oil level in the cooker will drop. This drop in oil level will cause a rapid drop in the oil level in both the inner tank 11 and the outer tank 12 because the pump 15 is continuously delivering a stream of oil to the cooker while no oil if overflowing from the cooker 31 into the inner tank 11. A second pressure-sensitive switch 44, similar to the pressure switch 40, is closed when the oil level in the outer tank 12 drops below a second predetermined level, which is below that level required to close the switch 40. When the switch 44 is closed, a motor 45 is energized to drive a pump 46. The pump 46 is effective to draw oil from the reservoir 16 through a normally open valve 47, a pipe 48 and to deliver the oil, through the pipe 22, to the inner tank 11. The pump 46 will continue to pump oil from the reservoir 16 to the inner tank 11 until the oil level rises in the outer tank 12 and opens the switch 44. The intake of the pump 46 is also connected through the pipe 48 and a normally closed valve 49 to an oil drain in the associated cooker. By closing the normally open valve 47 and opening the normally closed valve 49, the pump 46 can be operated to drain the cooker for cleaning. The oil is pumped from the cooker 31 through the inner tank 11, the filtering portion 14 of the media 13, the outer tank 12 and the overflow 42 into the reservoir 16. The heaters 43 maintain the oil in the reservoir 16 at a hot temperature while the cooker 31 is being serviced or cleaned. After the cooker 31 is serviced or cleaned, it is again filled with hot cooking oil by turning on the motors 20 and 45 for driving the pumps 15 and 46, respectively.

The cooking oil filter and level control apparatus 10 is designed such that it can be easily dismantled for cleaning. A union 50 is provided in the pipe 22 for removing an end portion 51 which extends into the inner tank 11. When the filter media 13 is removed from the inner tank 11 and the end portion 51 is removed from the pipe 22 at the union 50, the inner tank 11 may be lifted from the outer tank 12. The inner tank 11 is shown in FIG. 5 as it appears when it is lifted from the outer tank 12, with the exception that the idler rolls 26 and 27 have been removed. As shown in FIG. 6, each of the idler rolls 26 and 27 is mounted at its end between upper and lower bearing blocks 52 and 53, respectively. As shown in FIGS. 5 and 6, the inner tank 11 is also provided with a porous end portion 54 which extends above the normal oil level in the inner tank 11. The porous end 54 is provided as a safety measure to prevent contaminated oil from overflowing the edges 55 of the inner tank 11. If for any reason the filtering portion 14 of the filter media 13 should become dirty and the filter media 13 is not advanced, oil will flow from the inner tank 11 through clean filter media 13 and the porous end 54 of the inner tank 11 into the outer tank 12.

The outer tank 12 may also be removed to provide access to the reservoir 16 for cleaning. A plug 56 (see FIG. 1) is removed for draining the outer tank 12, the pipe 17, the check valve 18 and the pipe 19. By opening a normally close valve 57, the oil deliver pipe 21 may also be drained through the pipe 19 after the plug 56 is removed. After the system is drained, a union 58 is disconnected to separate the check valve 18 from the pipe 19 and the outer tank 12 may be lifted, together with the compaction rolls 28 and 29, from a tubular support stand 59 (see FIG. 2).

The outer tank 12 is shown in detail in FIG. 4. A pair of mounting brackets 60 are provided at one end of the outer tank 12 for mounting the compaction rolls 28 and 29. A trough 61 extends below the compaction rolls 28 and 29 for directing oil wrung from the dirty filter media 13 by the compaction rolls 28 and 29 into the outer tank 12.

Referring to FIGS. 7 and 8, the mounting for the compaction rolls 28 and 29 is shown in detail. As previously stated, the lower compaction roll 29 is driven by the chain 36 through the sprocket 37. A shaft 62 mounts the lower compaction roll 29 and is keyed to an axle 63 which is attached to the sprocket 37. The lower compaction roll 29 may be removed with the outer tank 12 when the outer tank 12 is lifted from the tubular support stand 59. As shown in detail in FIG. 8, the upper compaction roll 28 rotates in a bearing block 64. A spring 65 biases the bearing block 64 towards the lower compaction roll 29 such that the filter media 13 will be tightly squeezed between the upper and lower compaction rolls 28 and 29.

I claim:

1. Apparatus for continuously filtering hot cooking oil comprising, in combination, an outer tank, an inner tank having a porous bottom positioned within said outer tank, an elongated disposable filter media, means positioning a portion of said filter media over said porous bottom of said inner tank, means for delivering contaminated cooking oil from a cooker to said inner tank, whereby the contaminated oil flows from said inner tank through said portion of said filter media and said porous bottom into said outer tank, means for delivering filtered cooking oil from said outer tank to such cooker, means operative when said portion of said filter media becomes dirty for advancing said filter media to change the portion of said filter media positioned over said porous bottom of said inner tank whenever the oil level in said outer tank drops below a predetermined first level, an oil storage reservoir, and means for delivering oil from said reservoir to said inner tank whenever the oil level in said outer tank drops below a predetermined second level below said first level.

2. Apparatus for continuously filtering hot cooking oil, as defined in claim 1, and including oil overflow means connecting said outer tank to said reservoir, said overflow means limiting the maximum oil level in said outer tank.

3. Apparatus for continuously filtering hot cooking oil, as defined in claim 2, and including means for maintaining oil in said reservoir at a predetermined hot temperature, whereby cooking oil stored in said reservoir is maintained in a liquid state.

4. Apparatus for continuously filtering hot cooking oil, as defined in claim 2, wherein said means for delivering contaminated cooking oil from a cooker to said inner tank includes an oil overflow connected to limit the maximum oil level in such cooker, and wherein said means for delivering filtered cooking oil from said outer tank to such cooker includes a continuously operated pump, whereby the oil level in such cooker is maintained at the overflow level.

5. Apparatus for continuously filtering hot cooking oil, as defined in claim 1, including a supply roll and a takeup roll positioned adjacent opposed ends of said inner tank, and wherein said elongated filter media comprises a long sheet of filter paper, said filter paper extending from said supply roll, along said porous bottom of said inner tank to said takeup roll.

6. Apparatus for continuously filtering hot cooking oil, as defined in claim 5, wherein said means for advancing said filter paper includes a motor operatively connected for rotating said takeup roll to wind the dirty portion of said filter paper on said takeup roll.

7. Apparatus for continuously filtering hot cooking oil, as defined in claim 6, and including wringer means for removing oil from said filter paper and for compacting the filtered contaminant into said filter paper before the dirty portion is wound on said takeup roll.

8. Apparatus for continuously removing contaminated cooking oil from a cooker, filtering the oil and returning the filtered oil to the cooker, said apparatus comprising, in combination, an outer tank, an inner tank having a porous bottom, said inner tank being positioned within said outer tank, an elongated disposable filter media, a supply roll and a takeup roll positioned adjacent opposed ends of said inner tank, said filter media extending from said supply roll, along said porous bottom of said inner tank and to said takeup roll, means for delivering contaminated cooking oil from the cooker to said inner tank, the oil flowing from said inner tank through said filter media and said porous bottom into said outer tank, means for continuously delivering filtered cooking oil from said outer tank to the cooker, means for advancing said filter media from said supply roll along said porous bottom and from along said porous bottom to said takeup roll whenever the oil level in said outer tank drops below a predetermined first level, an oil storage reservoir, oil overflow means connecting said outer tank to said reservoir, said oil overflow means limiting the maximum oil level in said outer tank, and means for delivering oil from said reservoir to said inner tank whenever the oil level in said outer tank drops below a predetermined second level below said first level.

9. Apparatus for continuously removing hot contaminated cooking oil from a cooker, filtering the oil and returning the filtered oil to the cooker, as defined in claim 8, and including wringer means for removing oil from said filter media and for compacting the filtered contaminant into said filter media as said filter media is advanced to said takeup roll.